United States Patent
Itagaki et al.

(10) Patent No.: US 7,956,745 B2
(45) Date of Patent: Jun. 7, 2011

(54) WIRELESS TAG DETECTION APPARATUS AND METHOD OF CONTROLLING THE SAME

(75) Inventors: Yuya Itagaki, Shizuoka (JP); Shigeaki Suzuki, Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 341 days.

(21) Appl. No.: 12/211,086

(22) Filed: Sep. 15, 2008

(65) Prior Publication Data
US 2009/0201166 A1   Aug. 13, 2009

(30) Foreign Application Priority Data

Feb. 13, 2008 (JP) .................................. 2008-032264

(51) Int. Cl.
*G08B 13/14* (2006.01)
(52) U.S. Cl. ................. 340/572.1; 340/10.1; 340/568.1; 340/691.3
(58) Field of Classification Search ............... 340/572.1, 340/10.1, 10.3, 825.36, 825.49, 10.5, 10.33, 340/505, 10.51, 539.22, 568.1, 539.32, 691.3
See application file for complete search history.

(56) References Cited

U.S. PATENT DOCUMENTS

| | | | |
|---|---|---|---|
| 4,918,425 A * | 4/1990 | Greenberg et al. | 340/539.3 |
| 6,375,344 B1 | 4/2002 | Hanson et al. | |
| 7,064,663 B2 * | 6/2006 | Pucci et al. | 340/539.32 |
| 2002/0138372 A1 * | 9/2002 | Ludtke | 705/27 |
| 2007/0183794 A1 * | 8/2007 | Okada | 399/12 |
| 2007/0279277 A1 * | 12/2007 | Kuramoto et al. | 342/147 |
| 2008/0207357 A1 * | 8/2008 | Savarese et al. | 473/407 |

FOREIGN PATENT DOCUMENTS

| | | |
|---|---|---|
| FR | 2 746 200 | 9/1997 |
| JP | 2005-107792 | 4/2005 |
| JP | 2007-323423 | 12/2007 |
| WO | WO 01/52179 | 7/2001 |
| WO | WO 2006/095463 A1 | 9/2006 |

OTHER PUBLICATIONS

Chinese Office Action mailed Jul. 13, 2010 in Chinese Patent Application 200810211801.7.
EP Search Report from Application No. EP 08 01 6128 dated Nov. 12, 2008.
Finkenzeller et al.—"RFID-Handbuch", RFID Handbook: Grundlagen und Praktische Anwendungen, Sep. 26, 2002, pp. 203-224, XP-002341283.

* cited by examiner

*Primary Examiner* — Daniel Previl
(74) *Attorney, Agent, or Firm* — Patterson & Sheridan, LLP

(57) ABSTRACT

Query signals to one or more wireless tags are transmitted via radio communication, and a distance to a wireless tag to be retrieved is informed according to strength of a response signal from the wireless tag to be retrieved, which is included in the response signals transmitted from the one or more wireless tags via radio communication.

7 Claims, 6 Drawing Sheets

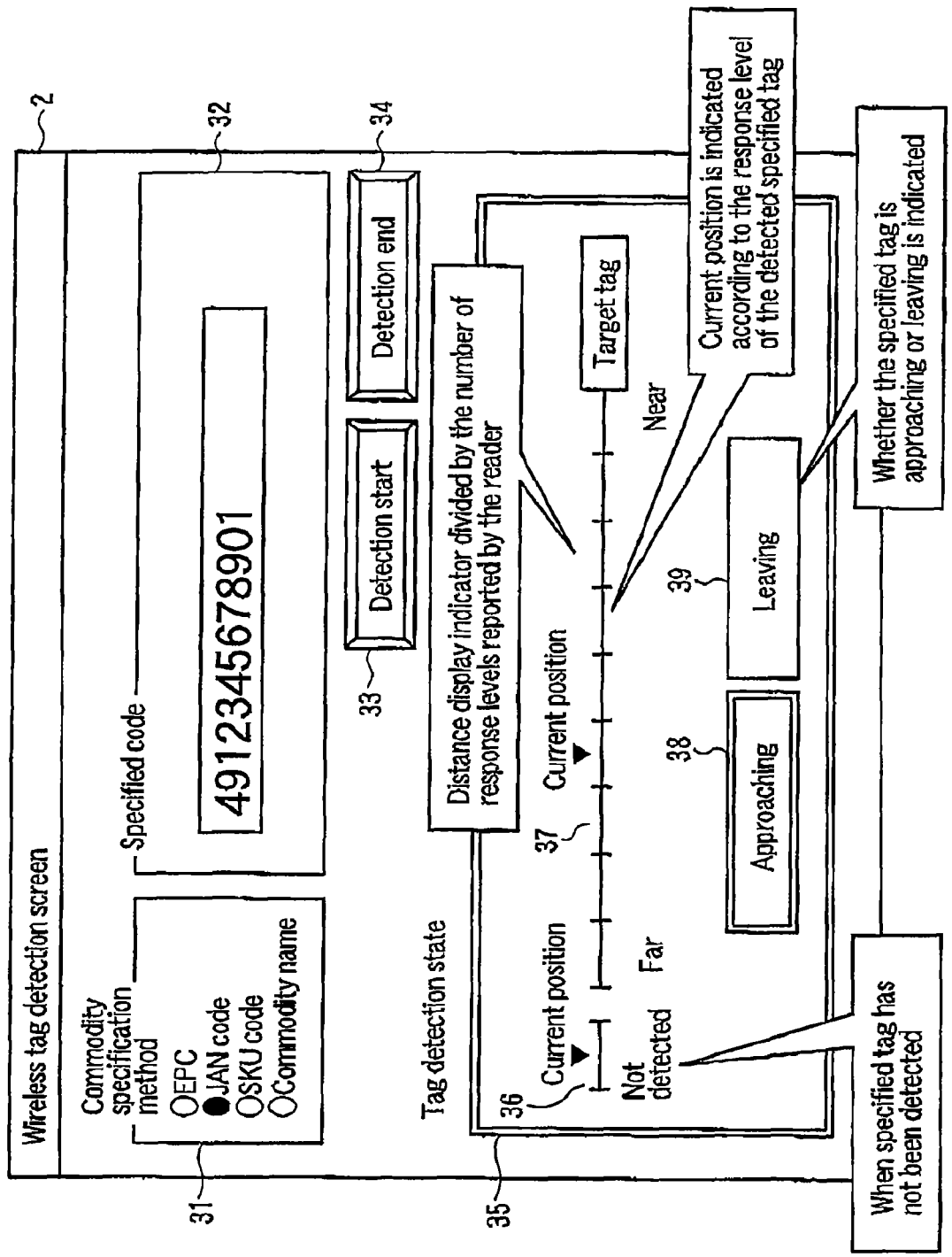
F I G. 3

| Strength detection table ||
|---|---|
| Adjusted gains: 0 (no amplification) to 255 (maximum amplification) | Strength of response signals |
| 0 | 10 |
| 1 | 10 |
| 2 | 10 |
| ⸝ | |
| 128 | 5 |
| 129 | 5 |
| ⸝ | |
| 255 | 1 | ement will
be set forth in the description which follows, and in part will be
obvious from the description, or may be learned by practice of
the invention. The objects and advantages of the invention
may be realized and obtained by means of the instrumentalities and combinations particularly pointed out hereinafter.

WIRELESS TAG DETECTION APPARATUS AND METHOD OF CONTROLLING THE SAME

CROSS-REFERENCE TO RELATED APPLICATIONS

This application is based upon and claims the benefit of priority from prior Japanese Patent Application No. 2008-032264, filed Feb. 13, 2008, the entire contents of which are incorporated herein by reference.

BACKGROUND OF THE INVENTION

1. Field of the Invention

The present invention relates to a wireless tag detection apparatus which detects a desired wireless tag from wireless tags attached to a number of articles and a method of controlling the wireless tag detection apparatus.

2. Description of the Related Art

A wireless communication apparatus comprising an antenna and capable of reading data from a memory included in each wireless tag and writing data to the memory by performing wireless communications with wireless tags present in the communication range of the antenna using radio waves has been developed and become commercially practical. In a memory of each wireless tag, a unique ID, the so-called tag identification information is stored. By reading the tag identification information, the wireless tags can be specified individually. Such wireless tags are called Radio Frequency Identification (RFID). Further, the wireless communication apparatus is called an RFID reader/writer.

By installing the so-called RFID system formed of such a wireless communication apparatus and wireless tags in a store which sells a number of commodities or a library which stores a number of books and attaching a wireless tag to each article, management of each article becomes easy.

An example of the RFID system is disclosed in Jpn. Pat. Appln. KOKAI Publication No. 2007-323423, in which an RFID reader receives a signal transmitted from a wireless tag, and determines whether the wireless tag is present in a predetermined area according to the power value of the reception signal. Another example is disclosed in Jpn. Pat. Appln. KOKAI Publication No. 2005-107792, in which the strength of a radio wave transmitted from a reader/writer and received by a wireless tag is detected by the wireless tag, and the detected data is transmitted from the wireless tag to the reader writer.

In a store which sells a number of commodities, there is a case where only one specific commodity needs to be selected from among a number of commodities displayed in the store or from among a number of commodities stored in a number of boxes as stock, when a request for purchase is made by a customer or when the commodity needs to be returned to the head office or the wholesaler, for example. Similarly, in a library which stores a number of books, there is a case where only one specific book needs to be selected from among a number of books, when a request for reading is made by a user or at the time of arrangement of the books.

In this case, even if a wireless tag is attached to each article, it is difficult to efficiently find one specific article with the above-described RFID system which determines existence of the wireless tag in a predetermined area and detects strength of a radio wave received by the wireless tag.

BRIEF SUMMARY OF THE INVENTION

An object of the wireless tag detection apparatus and the method or controlling the same according to the present invention is to find out only one specific article efficiently and promptly from among a number of articles.

The wireless tag detection apparatus according to the present invention comprises:

a transmission section which transmits query signals to one or more wireless tags via radio communication;

a reception section which receives one or more response signals transmitted via radio communication from the one or more wireless tags based on query signals transmitted via radio communication from the transmission section; and a controller which informs a distance to a wireless tag to be retrieved according to strength of a response signal from the wireless tag to be retrieved, the response signal from the wireless tag to be retrieved being included in the one or more response signals received by the reception means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows a wireless tag detection screen according to the embodiment of the present invention.

DETAILED DESCRIPTION OF THE INVENTION

Hereinafter, the embodiment of the present invention will be described with reference to the accompanying drawings.

Figure 1:
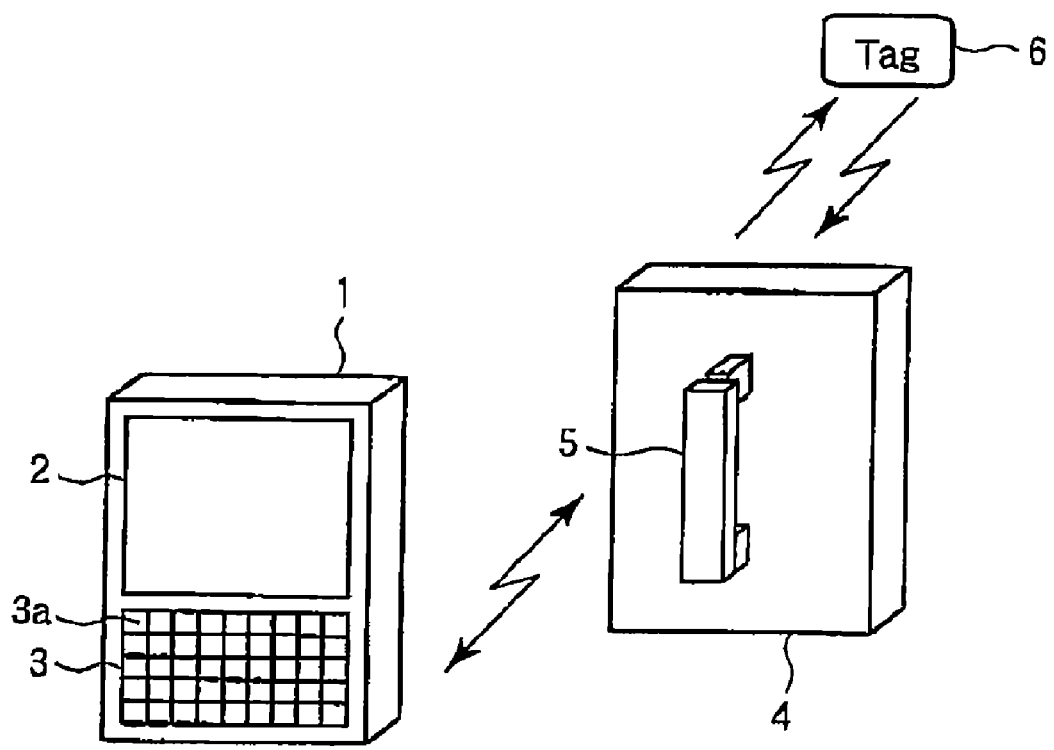
FIG. 1 shows an outer appearance of an embodiment of the present invention.

In FIG. 1, the reference numeral 1 denotes an apparatus body, i.e., a main unit, which can be carried one-handed and comprises a touch-panel liquid crystal display unit 2 and a keyboard 3 on a front surface. The keyboard 3 includes a power key 3a for turning on/off the power. A reader unit 4 is provided as an attachment to the main unit 1. The reader unit 4 includes a handle 5, which can also be held one-handed, on a back surface, and performs radio communications with a wireless tag 6 attached to an article such as a commodity in a store via a built-in antenna. The main unit 1 and the reader unit 4 are capable of mutual data communications using weak radio waves. For example, the main unit 1 is held with the left hand, the reader unit 4 is held with the right hand, and the reader unit 4 is used to be opposed to a retrieval target.

Figure 2:
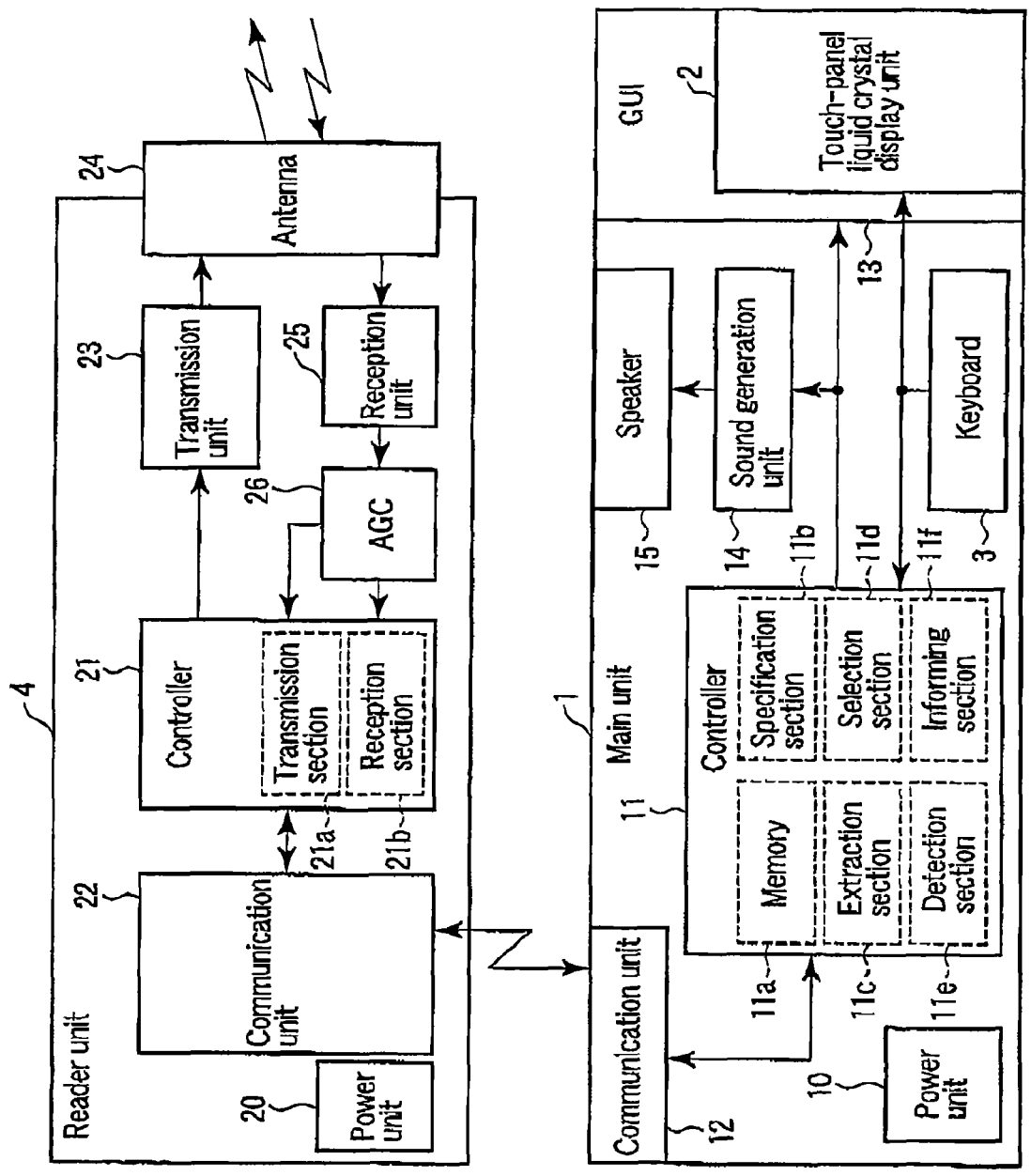
FIG. 2 is a block diagram showing a control circuit according to the embodiment of the present invention.

FIG. 2 shows a circuit configuration of the main unit 1 and the reader unit 4.

The main unit 1 includes a power unit 10 for outputting an operation voltage, and a controller 11 for controlling operations of the main unit 1 and the reader unit 1. The touch-panel liquid crystal display unit 2, the keyboard 3, a communication unit 12, a graphical user interface (GUI) 13, and a sound generation unit 14 are connected to the controller 11. The communication unit 12 performs data communications with the reader unit 4 using weak radio waves. The GUI 13 displays various screens such as a wireless tag detection screen on the touch-panel liquid crystal display unit 2, according to instructions prom the controller 11. The sound generation unit 14 generates sound signals such as consecutive beep sound signals according to instructions from the controller 11, and supplies them to a speaker 15. The speaker 15 converts the beep sound signals generated by the sound generation unit 14 to the actual sounds.

The wireless tag detection screen includes a commodity specification method display area 31 for displaying which of Electronic Product Code (EPC), Japanese article number (JAN) code, Stock Keeping Unit (SKU) code, and a commodity name, is specified as a commodity specification method, a display window 32 for displaying the input code, a detection start button 33 for instructing start of detection of a specific wireless tag 6, a detection end button 34 for instructing end of detection, and a tag detection state display area 35 for successively displaying the actual detection states, as shown in FIG. 3. In particular, the tag detection state display area 35 includes an undetection indicator 36 which illuminates along with indication of a current position mark ∇ on a scale when a wireless tag 6 of a commodity to be retrieved is not present within the communication range of the antenna 24 of the reader unit 4 and the wireless tag is not detected, a distance display indicator 37 which indicates the distance between the reader unit 4 and the wireless tag 6 to be retrieved in analog by means of the current position mark ∇ on the scale, an "Approaching" indicator 38 which illuminates when the current position of the reader unit 4 is approaching the wireless tag 6 of the commodity to be retrieved, and a "Leaving" indicator 39 which illuminates when the current position of the reader unit 4 is leaving from the wireless tag 6 of the commodity to be retrieved.

On the other hand, the reader unit 4 includes a power unit 20 which outputs an operation voltage and a controller 21 which controls operations of the reader unit 4. A communication unit 22, a transmission unit 23, and an automatic gain control (AGC) circuit 26 are connected to the controller 21. The communication unit 22 performs data communications with the main unit 1 using weak radio waves. The transmission unit 23 modulates specific carrier waves based on analog transmission data signals supplied from the controller 21, amplifies the modulated signals, and supply the amplified modulated signals to a directional antenna 24. The antenna 24 emits signals supplied from the transmission unit 23 as radio waves, and receives radio waves transmitted from the wireless tag 6 present within the communication range of the antenna 24. The reception signals are supplied to the reception unit 25. The reception unit 25 amplifies the reception signals from the antenna 24, demodulates the amplified signals to delete predetermined carrier components therefrom, and extracts signals in a predetermined low-frequency band through a low-pass filter (LPF) from the demodulated signals. The extracted signals are supplied to the AGC circuit 26. The AGC circuit 26 amplifies signals supplied from the reception unit 25 and adjusts the gain such that the amplified signal level becomes a certain appropriate level. The output signals from the AGC circuit 26 are supplied to the controller 21. Further, as elements for detecting strength of the reception signals from the wireless tag 6, an adjusted gain value adjusted by the AGC circuit 26, such as an adjusted gain value between "0 (no amplification)" and "255 (maximum amplification)" is supplied to the controller 21.

Further, based on mutual data communications, as substantial functions relating to wireless tag detection, each of the controller 11 of the main unit 1 and the controller 21 or the reader unit 4 has the following means (1)-(7):

(1) a specification section for specifying a commodity to be retrieved by a code according to an operation of the keyboard 3 in the main unit 1;

(2) an extraction section which extracts tag identification information corresponding to the specified code from a commodity database stored in a memory of the controller 11;

(3) a transmission section which causes the antenna 24 of the reader unit 4 to transmit query signals via radio communication to a plurality of wireless tags 6;

(4) a reception section which causes the antenna 24 to receive response signals transmitted via radio communication from the wireless tags 6 based on the query signals transmitted via radio communication;

(5) a selection section which selects response signals containing tag identification information which is the same as the extracted tag identification information from the received response signals;

(6) a detection section which detects strength of the selected response signals with reference to a strength detection table, which is stored in the memory in the controller 11 and based on the adjusted gain value data supplied from the AGC circuit 26; and (7) an informing section which informs the distance to the wireless tag 6 which has transmitted the extracted response signal and whether the distance becomes short or great according to the detected strength and its change, by means of display on the wireless tag detection screen of the touch-panel liquid crystal display unit 2 and generation of beep sounds from the speaker 15.

On the other hand, the wireless tag 6 includes an IC chip on which a power generation unit, a demodulation unit, a modulation unit, a memory, and a controller are provided, and an antenna, and is configured to demodulate reception signals of the antenna and capture them in the controller, and demodulate signals emitted from the controller and transmit them via radio communication from the antenna. An ID unique to the wireless tag, the so-called tag identification information, is stored in the memory. As such tag identification information, an electronic product code (EPC) for product identification is used, for example. The wireless tag 6 with the aforementioned configuration is attached to each of a number of commodities in a store.

Figure 4:
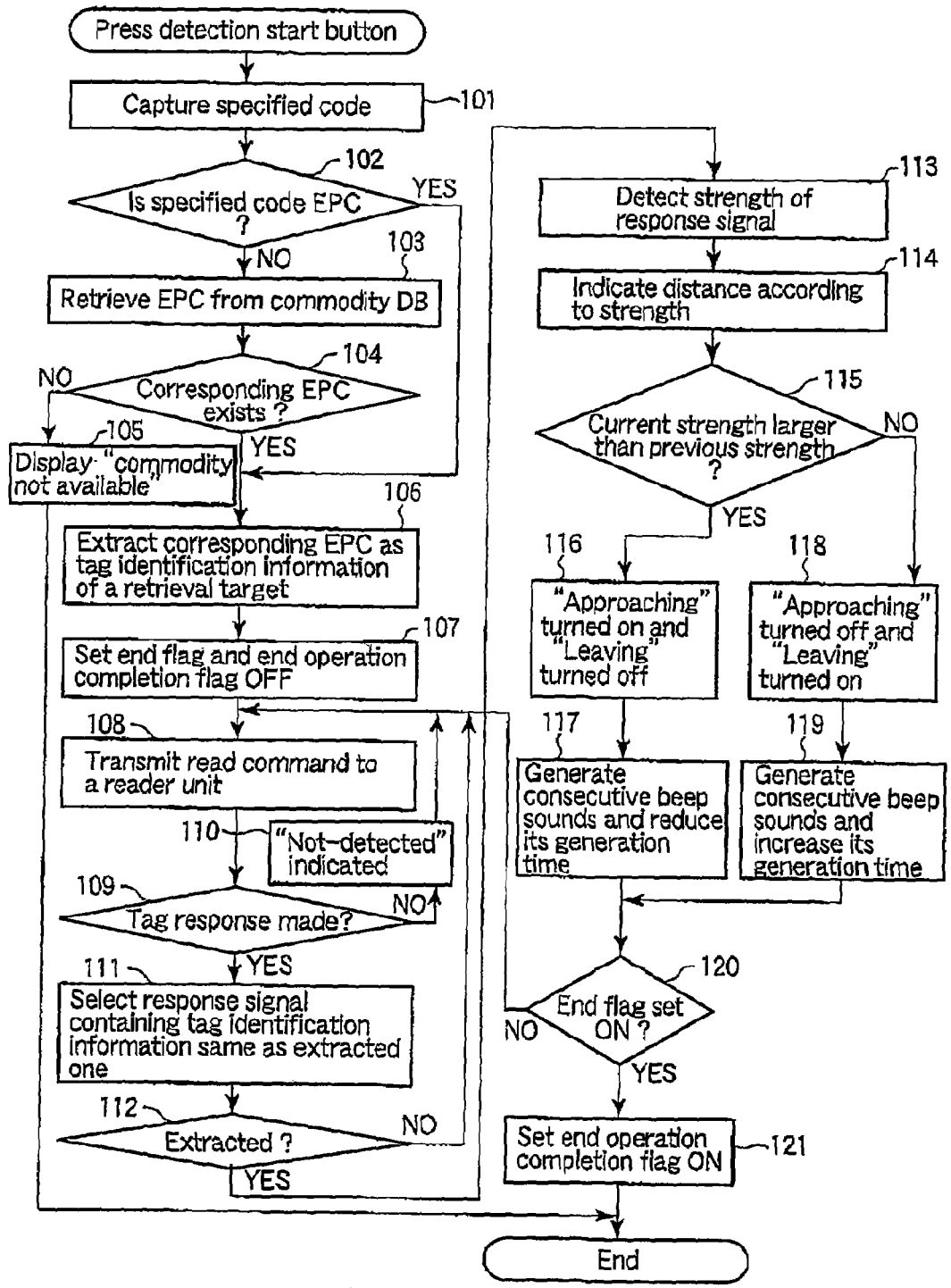
FIG. 4 is a flowchart for explaining control of the main unit when a detection start button is touch-operated according to the embodiment.
Figures 5, 6:
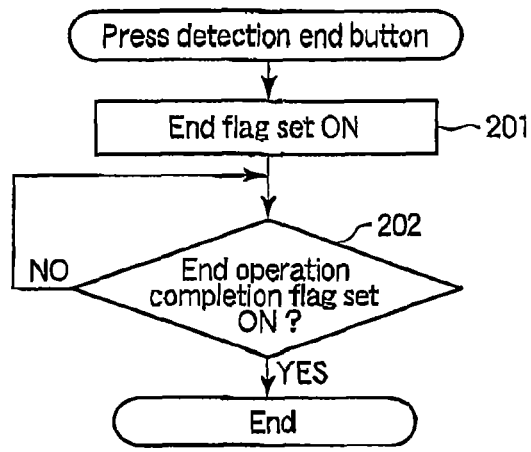
FIG. 5 is a flowchart for explaining control of the main unit when a wireless tag detection screen is touch-operated according to the embodiment.
FIG. 6 shows a commodity database according to the embodiment.

Next, operations will be described with reference to the flowcharts of FIGS. 4 and 5. The flowchart of FIG. 4 shows control executed by the controller 11 of the main unit 1 when the detection start button 33 on the wireless tag detection screen of the touch-panel liquid crystal display unit 2 is touch-operated. The flowchart of FIG. 5 shows control executed by the controller 11 of the main unit 1 when the detection end button 34 on the wireless tag detection screen of the touch-panel liquid crystal display unit 2 is touch-operated.

In order to find a specific commodity from among a number of commodities in a store, a store clerk specifies one of the EPC, the JAN code, the SKU code, and the commodity name as a method for specifying the commodity by the keyboard 3 and actually inputs the code via the keyboard 3. For example, when the JAN code is specified, the indicator section of the JAN code in the commodity specification method display area 31 illuminates, and the actually input JAN code is indicated on the display window 32 as a specified code, as shown in FIG. 3.

When the detection start button 33 on the wireless tag detection screen of the touch-panel liquid crystal display unit 2 is touch-operated by a clerk in this state, the input specified code is captured (Act101), and it is determined whether the specified code is an EPC or not (Act102).

In this case, the specified code is a JAN code. Therefore, based on the determination that the specified code is not an EPC (NO in Act102), the commodity database in the controller 11 is referred to based on the CAN code, and an EPC corresponding to the JAN code is retrieved (Act103).

When an EPC corresponding to the JAN code does not exist in this retrieval (No in Act104), the message "commodity not available" is indicated on the touch-panel liquid crystal display unit 2 in place of the wireless tag detection screen (Act105). By this display, the detection operation ends.

When an EPC corresponding to the JAN code exists in the above-described retrieval (YES in Act104), the corresponding EPC is extracted as tag identification information to be retrieved (Act106). When the specified code is an EPC (Yes in Act102), the EPC is directly extracted as tag identification information of a retrieval target (Act106). According to the extraction, an end flag giving an indication of whether the detection end button 34 has been touch-operated or not, and an end operation completion flag giving an indication of whether the detection operation has ended or not are set OFF (Act107), and a read command is transmitted to the reader unit 4 (Act108).

Since the read command is transmitted to the reader unit 4, a query signal of the tag identification information is transmitted via radio communication from the antenna 24 of the reader unit 4. When at least one wireless tag 6 is present within the communication range of the antenna 24, a response signal is transmitted via radio communication from the wireless tag 6.

When the response signal is not received by the reader unit 4, based on the determination that no tag response was made (NO in Act109), the undetection indicator 36 on the wireless tag detection screen illuminates along with indication of the current position mark ∇ (Act110). Then, a read command is transmitted to the reader unit 4 again (Act108).

When one or more response signals are received by the reader unit 4, based on the determination that the tag response was made (YES in Act109), a response signal containing tag identification information which is the same as the extracted tag identification information is selected from the received response signals (Act111). When no response signals are selected (NO in Act112), the procedure returns to Act108, and a read command is transmitted to the reader unit 4 again.

Figures 7, 8:
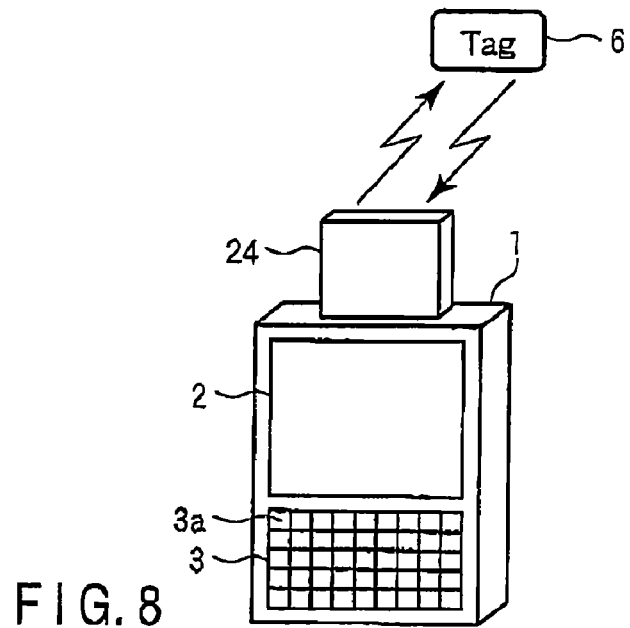
FIG. 7 shows a strength detection table according to the embodiment.
FIG. 8 shows a modification example of the outer appearance of the embodiment.

When the response signal is actually selected (YES in Act112), the strength of the selected response signal is detected with reference to the strength detection table, as shown in FIG. 7, based on data on the adjusted gain value supplied from the AGC circuit 26 (Act113). The detected strength is stored in an inner memory of the controller 11 as "current strength". In the inner memory, a first storage area for storing "current strength" and a second storage area for storing "previous strength" are provided. When the strength is detected in the next reception, "current strength" in the first storage area is overwritten and stored in the second storage area as "previous strength", and the newly detected strength is overwritten and stored as the "current strength".

In the strength detection table, the 10-level strengths "10 (maximum)" to "1 (minimum)" are assigned to adjusted gain values "0 (no amplification)" to "255 (maximum amplification)". Further, 10-level distances "short distance" to "great distance" are assigned to the 10-level strengths "10 (maximum)" to "1 (minimum)". The "short distance" corresponds to the maximum strength "10", and the "great distance" corresponds to the minimum strength "1". The 10-level distances ranging from "1" to "10" are assigned by setting the "short distance" to "1", and setting the "great distance" to "10", for example.

The detected strength is indicated in analog by the distance display indicator 37. On the scale of the distance display indicator 37, the leftmost tick mark indicates "10 (far)", and the rightmost tick mark indicates "1 (near)". The current position mark ∇ is indicated at the position on the scale according to the 10-level distances. Therefore, the distance to the wireless tag 6 to be retrieved can be visually recognized by the position on the scale indicated by the current position mark ∇.

Further, the detected "current strength" and the "precious strength" stored in the inner memory of the controller 11 are compared (Act115). When the "current strength" is greater than the "previous strength" (YES in Act115), based on the determination that the reader unit 4 is approaching the wireless tag 6 to be retrieved, the "Approaching" indicator 38 illuminates and the "Leaving" indicator 39 goes out on the wireless tag detection screen of the touch-panel liquid crystal display 2 (Act116). At the same time, the time during which consecutive beep sounds are generated from the speaker 15 is reduced to be shorter than before (Act117).

By the illumination of the "Approaching" indicator 38 and the reduction of the beep sound generation time, a clerk can recognize that the reader unit 4 is approaching the wireless tag 6 to be retrieved.

When the "current strength" is smaller than the "previous strength" (NO in Act115), based on the determination that the reader unit 4 is leaving from the wireless tag 6 to be retrieved, the "Approaching" indicator 30 goes out and the "Leaving" indicator 39 illuminates on the wireless tag detection screen of the touch-panel liquid crystal display 2 (Act118). At the same time, the time during which consecutive beep sounds are generated from the speaker 15 is extended to be longer than before (Act119).

By the illumination of the "Leaving" indicator 39 and the extension of the beep sound generation time, a clerk can recognize that the reader unit 4 is leaving from the wireless tag 6 to be retrieved.

Here, it is determined whether an end flag giving an indication of whether the detection end button 34 is touch-operated or not is set ON (Act120). When the end flag is not set ON (NO in Act120), the procedure returns to Act108, and a read command is transmitted to the reader unit 4 again. When the end flag is set ON (YES in Act120), based on the determination that the detection end button 34 is touch-operated, the end operation completion flag is set ON (Act121), and thereby the detection operation ends.

As described above, the distance to the wireless tag 6 to be retrieved is indicated by the distance display indicator 37 in analog such that the distance can be recognized at first sight. Further, when the wireless tag 6 to be retrieved is approaching, the "Approaching" indicator 38 illuminates and the beep sound generation time is reduced, while when the wireless tag 6 to be retrieved is leaving, the "Leaving" indicator 39 illuminates and the beep sound generation time is extended. Thereby, a clerk is capable of approaching the wireless tag 6 to be retrieved by perceiving the distance to the wireless tag 6 to be retrieved both visually and aurally.

When the reader unit 4 reaches the wireless tag 6 to be retrieved, the beep sounds are generated at the shortest time interval and the current position mark ∇ is moved to the rightmost position on the scale, at which "Target tag" is indicated.

Thus, a store clerk can efficiently and promptly find only one specific article from among a number of articles.

When the detection end button 34 on the wireless tag detection screen of the touch-panel liquid crystal display unit 2 is touch-operated by a clerk after completion of or during detection, the end flag is set ON (Act201). Then, when the end operation completion flag is set ON (YES in Act202), the operation ends.

In the above-described embodiment, the case where response signals are transmitted via radio communication from all the wireless tags 6 which have received query signals from the reader unit 4, and a response signal including tag identification information to be retrieved is extracted from the response signals, has been described as an example. However, the present invention is applicable to a case where tag identification information is specified by a query signal and a response signal is transmitted via radio communication from only a wireless tag 6 containing tag identification information which is the same as the specified tag identification information.

Further, in the above-described embodiment, the beep sounds are generated from the main unit 1. However, by providing a sound generation unit 14 and a speaker 15 in a reader unit 4, the beep sounds may be generated from the reader unit 4.

Moreover, in the above-described embodiment, a separate-type wireless tag detection apparatus formed of the main unit 1 and the reader unit 4 has been described as an example. However, the present invention can be carried out by an integrated wireless tag detection apparatus in which the functions of the reader unit 4 are included in the main unit 1, as shown in FIG. 8. In this case, a projecting antenna 24 is provided on an upper surface of the main unit 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless tag detection apparatus comprising:
   transmission means for transmitting query signals to one or more wireless tags via radio communication;
   reception means for receiving one or more response signals transmitted via radio communication from the one or more wireless tags based on query signals transmitted via radio communication from the transmission means;
   specification means for specifying a wireless tag to be retrieved;
   extraction means for extracting tag identification information corresponding to the wireless tag specified by the specification means;
   selection means for selecting a response signal containing tag identification information if the tag identification information is the same as the tag identification information extracted by the extraction means, from the one or more response signals received by the reception means;
   detection means for detecting strength of the response signal selected by the selection means each time the response signal is selected; and
   informing means for informing whether a distance to the wireless tag specified by the specification means has shortened or increased according to comparison of strengths between each detection performed by the detection means.

2. The apparatus according to claim 1, wherein the informing means compares a strength detected currently and a strength detected previously by the detection means, and, when the currently detected strength is equal to or greater than the previously detected strength, informs that the distance to the wireless tag specified by the specification means has shortened, and, when the currently detected strength is smaller than the previously detected strength, informs that the distance to the wireless tag specified by the specific means has increased.

3. The apparatus according to claim 1, further comprising:
   an antenna configured to transmit the query signals via radio communication and receive the response signals; and
   a handheld reader unit including the antenna and separated from an apparatus body.

4. A wireless tag detection apparatus comprising:
   a transmission section which transmits query signals to one or more wireless tags via radio communication;
   a reception section which receives one or more response signals transmitted from the one or more wireless tags via radio communication based on the query signals transmitted via radio communication from the transmission section;
   a specification section which specifies a wireless tag to be retrieved;
   an extraction section which extracts tag identification information corresponding to the wireless tag specified by the specification section;
   a selection section which selects a response signal containing tag identification information if the tag identification information is the same as the tag identification information extracted by the extraction section, from the one or more response signals received by the reception section;
   a detection section which detects strength of the response signal selected by the selection section each time the response signal is selected; and
   an informing section which informs whether a distance to the wireless tag specified by the specification section has shortened or increased according to comparison of strengths between each detection performed by the detection section.

5. The apparatus according to claim 4, wherein the informing section compares a strength detected currently and a strength detected previously by the detection section, and, when the currently detected strength is equal to or greater than the previously detected strength, informs that the distance to the wireless tag specified by the specification section has shortened, and, when the currently detected strength is smaller than the previously detected strength, informs that the distance to the wireless tag specified by the specific section has increased.

6. The apparatus according to claim 4, further comprising:
   an antenna configured to transmit the query signals via radio communication and receive the response signals; and
   a handheld reader unit including the antenna and separated from an apparatus body.

7. A method of controlling a wireless tag detection apparatus, comprising:

transmitting query signals to one or more wireless tags via radio communication;

receiving response signals transmitted via radio communication from the one or more wireless tags based on the query signals transmitted via radio communication;

specifying a wireless tag to be retrieved;

extracting tag identification information corresponding to the wireless tag specified;

selecting a response signal containing tag identification information if the tag identification information is the same as the tag identification information extracted from the one or more response signals received;

detecting strength of the response signal selected, each time the response signal is selected; and informing whether a distance to the wireless tag specified has shortened or increased according to comparison of strengths between each detecting.

* * * * *